United States Patent [19]

Carla et al.

[11] Patent Number: 5,046,686

[45] Date of Patent: Sep. 10, 1991

[54] CLACK VALVE AND FLAP VALVE WITH A CONTROLLED VALVE AS WELL AS AIRCRAFT WITH CONTROLLED VALVE OF THIS TYPE

[75] Inventors: Francis Carla, St. Orens de Gameville; Bruno Baroux, Toulouse; Jacques Fraisse, Auzielle; Jacques Signoret, Toulouse, all of France

[73] Assignee: ABG-SEMCA, Toulouse, France

[21] Appl. No.: 338,173

[22] Filed: Apr. 14, 1989

[30] Foreign Application Priority Data

Apr. 18, 1988 [FR] France ............................ 88 05067

[51] Int. Cl.$^5$ ............................................ B64D 13/04
[52] U.S. Cl. .............................. 244/118.5; 137/599.2; 137/527; 98/1.5
[58] Field of Search ................. 244/118.5, 129.1, 1 R; 137/599.2, 527, 512, 512.2; 98/1.51

[56] References Cited

U.S. PATENT DOCUMENTS

| | | | |
|---|---|---|---|
| Re. 32,554 | 12/1987 | Murphy | 98/1.5 |
| 1,872,412 | 8/1932 | Cole | 137/599.2 |
| 2,363,117 | 11/1944 | Butler | |
| 3,123,867 | 3/1964 | Combs | 137/512 |
| 3,425,333 | 2/1969 | Wachter | 48/1.5 |
| 3,945,395 | 3/1976 | Reinicke et al. | |
| 3,993,096 | 11/1976 | Wilson | 137/512.2 |
| 4,249,567 | 2/1981 | Weiss | 137/527 |
| 4,432,514 | 2/1984 | Brandon | |

FOREIGN PATENT DOCUMENTS

| | | |
|---|---|---|
| 2335885 | 7/1977 | France |
| 4352 | 2/1916 | United Kingdom |
| 951048 | 3/1964 | United Kingdom |

Primary Examiner—Galen Barefoot
Attorney, Agent, or Firm—Oblon, Spivak, McClelland, Maier & Neustadt

[57] ABSTRACT

A controlled valve with clack valve and a clack valve including a controlled valve, as well as an aircraft with a controlled valve of this type, are disclosed. The disclosed controlled valve has a clack valve on its surface. The controlled valve is used for the "fine" regulation of pressure or flow rate. The clack valve enables safety balancing of pressure. The incorporation of the clack valve in the controlled valve or of the controlled valve in the clack valve makes it possible to have only one opening in the partition surface and, thus, to reduce the weight and cost while increasing security. The disclosed device can be applied to any device for the regulation of pressure and/or flow rate between a chamber and the exterior or between two chambers having a safety balancing device. The disclosure can be applied notably in aeronautical construction, the construction of petroleum refineries, of fluid distribution devices and of chemical reactors.

4 Claims, 3 Drawing Sheets

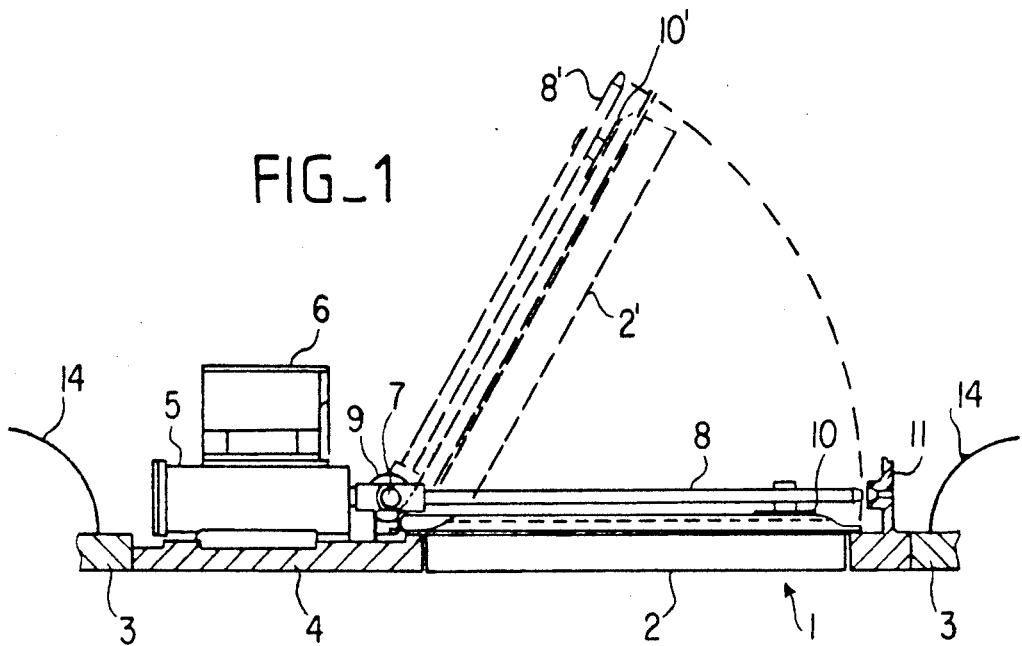
FIG_1
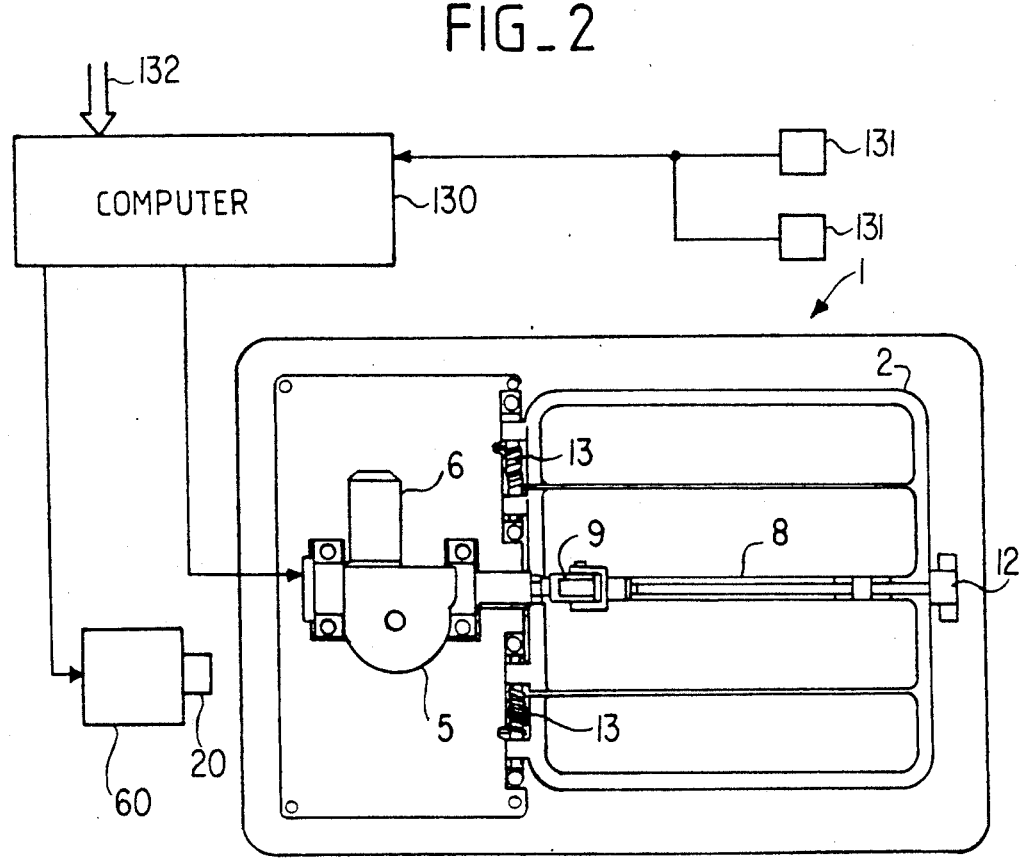
FIG_2

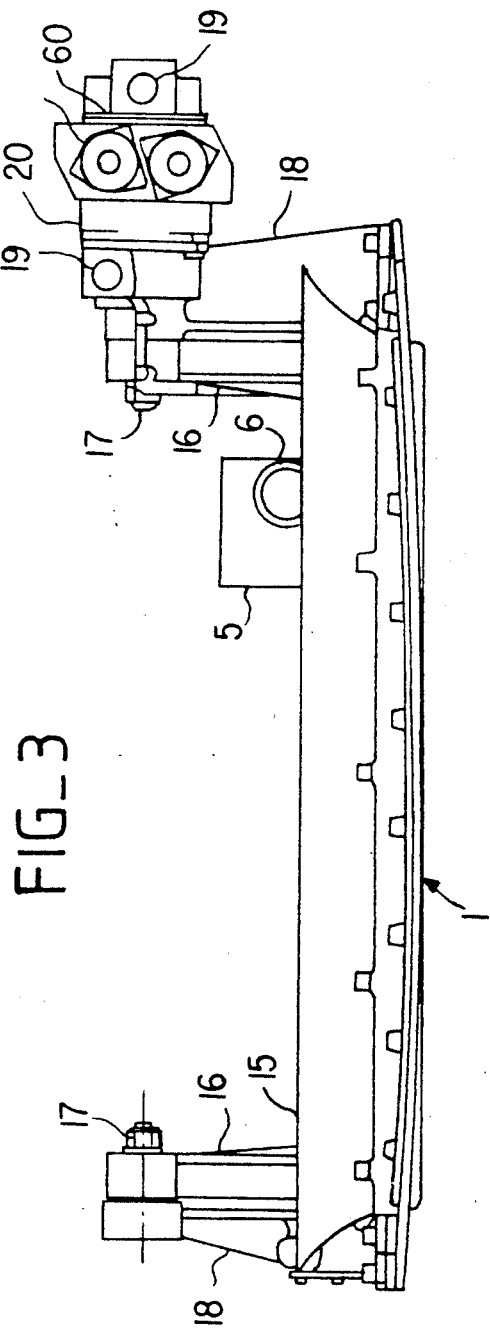
FIG_3
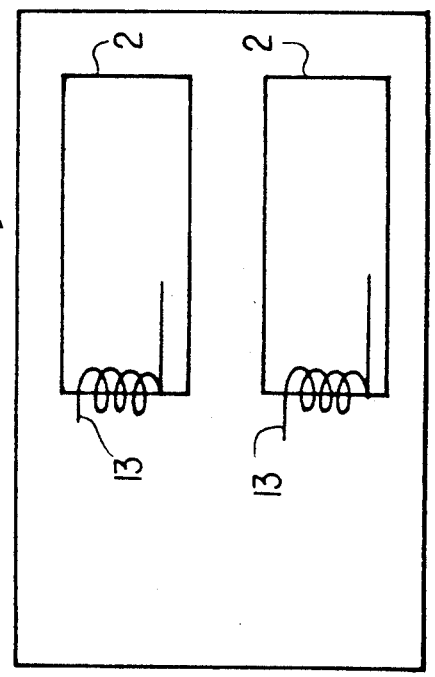
FIG_4

CLACK VALVE AND FLAP VALVE WITH A CONTROLLED VALVE AS WELL AS AIRCRAFT WITH CONTROLLED VALVE OF THIS TYPE

BACKGROUND OF THE INVENTION

1. Field of the Invention

The invention relates chiefly to a controlled valve (defined herein as a valve that operates under a control applied to it) with a clack valve (defined herein as a valve that opens and shuts automatically under pressure applied to it) and a clack valve including a controlled valve as well as an aircraft having a controlled valve of this type.

2. Description of the Prior Art

Firstly, there are prior art controlled valves which make it possible, on command or actuation, to let through a desired flow rate of a fluid between, for example, two chambers within which different pressures prevail. The prior art type controlled valves enable the regulation of flow rates or pressures. To enable stable regulation, the controlled valves are designed to work in a determined range of flow rates. Thus, it is not possible, on command, for example if there is trouble, to balance the pressures by fast and complete opening of the controlled valve. Furthermore, the prior art type controlled valves act only upon external actuation. Thus, the malfunctioning of the external actuating device makes the controlled valve completely ineffective.

Secondly, there are prior art clack valves, designed to open if the pressure difference between their two faces goes beyond a pre-determined threshold. Clack valves can be used to make reliable, autonomous safety systems. The instantaneous opening of the clack valve enables fast balancing of pressures on either side of said clack valve. However, it is not possible to control the flow passing through an open clack valve.

Now, it turns out that the fact of having a clack valve or a controlled valve on a partition wall between, for example, two chambers or between a chamber and the exterior, raises major problems. Firstly, there should be the space needed for the controlled valve and the clack valve. This is not always the case, notably if the controlled valves and clack valves have to be placed, for example, on a piping system that connects tubes of chemical reactors or the points of, for example, a petroleum distillation tower.

Secondly, the fact of making an opening, needed for the controlled valve and the clack valve to pass through, embrittles the wall. This embrittlement could be partially compensated for by a structure which is, for example, metallic, positioned around the controlled valve and the clack valve. However, this metallic structure is costly and heavy. The additional weight has particularly serious implications in the context of aircraft manufacturing.

SUMMARY OF THE INVENTION

The present invention consists of a controlled valve having a clack valve on its surface, or of a clack valve having a controlled valve on its surface. Thus it is possible to combine all the advantages of the controlled valve and the clack valve. For, in no case will two chambers be simultaneously connected by a controlled valve and an open clack valve. An open clack valve would, in this case, prevent any regulation of the flow rate by the controlled valve. Furthermore, the device according to the present invention enables the number of holes, that have to be made in the wall supporting it, to be limited to only one. Thus, the embrittlement of the wall is minimized and the weight is reduced by the elimination of a structure surrounding the opening while, at the same time, reducing the cost of manufacture. Furthermore, in cases where the available surface is limited, the device according to the present invention enables the making of a single opening which is bigger, instead of two openings, one designed for the controlled valve and the other for the clack valve. Thus, with the device according to the present invention, it is possible to make controlled valves and clack valves that have greater exchange surfaces and, thereby, to improve the working and the safety of the device.

BRIEF DESCRIPTION OF THE DRAWINGS

The invention shall be better understood from the following description and the appended figures, given as non-restricted examples, of which:

FIG. 1 shows a side view of a first exemplary embodiment of the device according to the present invention;

FIG. 2 shows a top view of a first exemplary embodiment of the device according to the present invention;

FIG. 3 shows a side view of an alternative embodiment of the device of FIGS. 1 and 2;

FIG. 4 shows a top view of a second exemplary embodiment of the device according to the present invention;

In FIGS. 1 to 5, the same references are used to designate the same elements.

DESCRIPTION OF PREFERRED EMBODIMENTS

Figure 5:
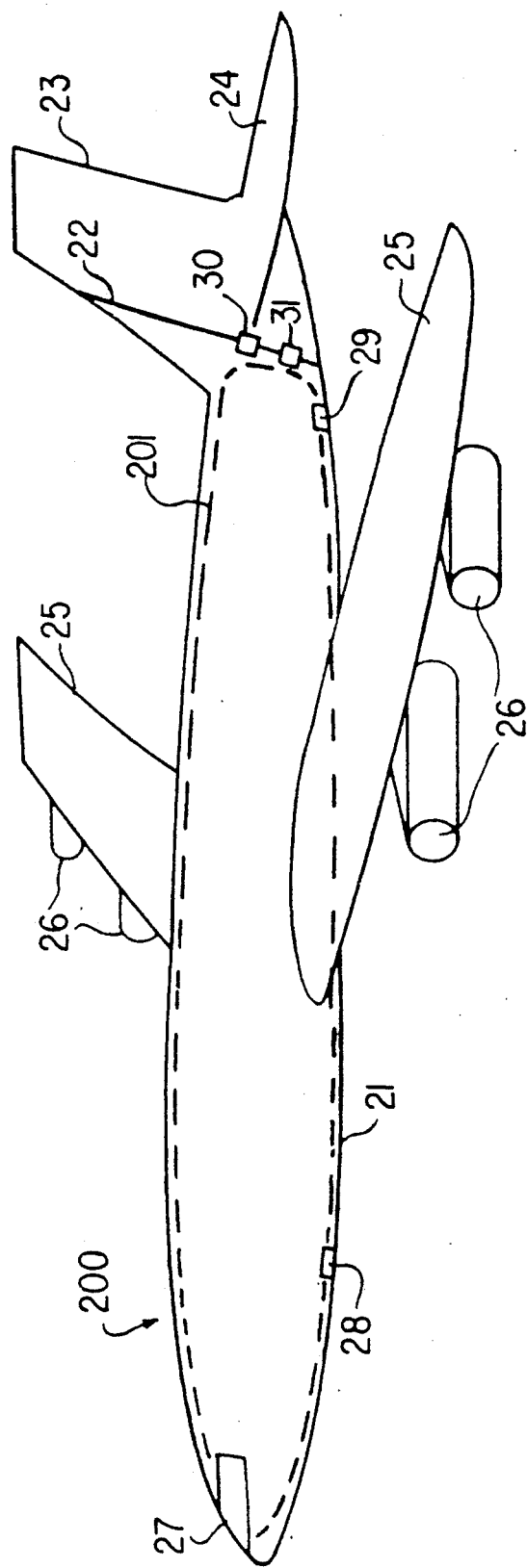
FIG. 5 shows a view in perspective of an aircraft according to the present invention.

FIG. 1 shows a first exemplary embodiment of a controlled valve 1, according to the present invention, comprising a clack valve 2. The controlled valve shown in FIG. 1 is a tilting valve for example. The withdrawal, towards the top of FIG. 1, of the flap 4 of the controlled valve leaves a space, of varying size, between the flap 4, on the one hand, and the partition 3 and the internal flared-out partition 14. The flow rate of the fluid going through the controlled valve 1 depends on the difference in pressure between the two faces of the controlled valve 1 and the surface released by the controlled valve.

In an autonomous way, the clack valve 2 can be opened if the difference in pressure on both its faces is greater than a threshold. In a first version of the device according to the present invention, the clack valve stays open after the pressure on its two faces is balanced.

Advantageously, the clack valve 2 has pull-back means enabling it to be closed after the pressure difference between its two faces has become smaller than the threshold for opening. The clack valve 2 is, for example, brought back to the position closed by two springs. In the exemplary embodiment shown in FIG. 1, the clack valve 2 pivots on a shaft 7. It must be noted that the partition 3, the flap 4 of the controlled valve and the clack valve 2 form a continuous surface without any roughness. Embodiments of this type may be advantageous, for example, in aviation. They can be installed without appreciably increasing the aerodynamic drag of the aircraft. However, allowance must be made for reinforcements of the aircraft skin, subsequent to the making of the hole designed to let through the controlled valve 1, comprising the clack valve 2.

It may prove to be important to be able to hermetically isolate the two faces of the partition 3, independently of the pressure conditions prevailing therein. For example, a device to close the clack valve 2 enables the controlled valve 1, according to the present invention, to be placed beneath the waterline of an aircraft. Thus, in the event of splash-down, the pilot will be able to lock the clack valve 2 to prevent the aircraft from sinking. In the exemplary embodiment of FIG. 1, the device according to the present invention has means to re-shut the clack valve 2 from an open position 2' and means to keep it closed definitively. In the exemplary embodiment of FIG. 1, the device has a motor 6, which is advantageously electrical. This motor 6 drives an actuator 5 on command. The actuator 5 has, for example, a rack and gears. On the rack, there is a puck 9. Upon command, the motor 6 makes the rack comprising the puck 9 go forward. The puck 9 presses the flap 2' and makes it close. Advantageously, the actuator 5 is a prior art type of irreversible actuator. An irreversible actuator is a mechanical assembly which, if it is not actuated, for example by the motor 6, retains its position. Thus, the puck 9 blocks the partition 2 of the clack valve. However, inasmuch as it is sought to provide maximum security, the rack is extended by a rod 8 (marked 8' in open position) which is capable, in the closed position, of taking position in a bolt 11. Advantageously, a holding part 10 (marked 10' in the open position) is connected to the rod 8. This holding part 10 rests internally on the partition of the clack valve 2.

In the embodiment shown in FIG. 1, the rod 8 pivots on the shaft 7 to enable efficient, normal functioning of the clack valve 2.

The clack valve 2', the rod 8' and the holding part 10' are shown in the open position with dotted lines in FIG. 1.

FIG. 2 shows the controlled valve 1 seen from the top. In the example shown in FIG. 2, the clack valve is locked in the closed position, the rod 8 being engaged in the bolt 12. In the exemplary embodiment of FIG. 2, the clack valve is kept closed by two springs 13, placed symmetrically with respect to the axis. The springs 13 are placed symmetrically to enable the puck 9 and the rod 8 to occupy the central position. Clearly, other arrangements do not go beyond the scope of the present invention. The motor may be replaced by an electromagnet. The control of the motor 6, providing for the closing and the locking of the clack valve 2, is provided either directly, for example from the dashboard of the aircraft, or by means of a computer 130 as shown in the figure. Advantageously, the same computer was used to control the motor 60, which provides for the opening and closing of the valve 1. In one exemplary embodiment, the computer 130 receives pieces of information, for example on the pressure prevailing within the aircraft, from sensors 131 and, for example, information on the external pressure through a bus 132. The information on the external pressure comes, for example, from another flight computer.

FIG. 3 shows an exemplary embodiment of the device according to the present invention. In the example of FIG. 3, the opening of the flap is done by pivoting on the shaft 17. The pivoting is obtained by two electrical motors 60 and a reduction gear 20. The electrical supply for the control signals is given to the motor 60 as well as to the motor 6 of the clack valve 2 through one or two connectors 19. The flap is connected to the shaft 17 by two struts 16. The shaft 17 is connected to the support, for example the aircraft, by two lateral struts 18.

The struts 16 are fixed to the flap 1.

The struts 18 are fixed to the frame 21 of the controlled valve.

FIG. 4 shows an alternative embodiment of the device according to the present invention. In the case of FIG. 4, the controlled valve 1 has two clack valves 2. The use of two clack valves makes it possible to set two pressure difference thresholds for the opening of the clack valves. This threshold difference is possible through the use of two springs 13 having different force values, and by providing the clack valve 2 with different areas. In an alternative embodiment, there are two clack valves 2, each capable of opening in a different direction.

Other alternatives do not go beyond the scope of the present invention. For example, a controlled valve can be made on the surface of a clack valve. This approach will be adapted notably when the area of the clack valves should be greater than that of the controlled valve.

FIG. 5 shows an aircraft 200 according to the present invention. The aircraft 200 has a pressurized chamber 201, two wings 25, for example four engines 26, a vertical rudder 23, two tail assemblies 24 and a cockpit 27.

The pressurized chamber 201 is demarcated by the external structure 21 of the aircraft, called the skin, and by a rear partition 22. The rear partition 22 is relatively fragile to reduce the mass of the aircraft. This pressurized chamber should have two safety valves 30, 31 responsible for limiting, underpressure overpressure and depression, the pressure difference between the pressurized chamber and the exterior, and thus responsible for preventing any deformation in the structure of the aircraft.

This pressure difference may arise, under overpressure, from a regulation malfunction and, under depression, from a rapid change in altitude (urgent descent) for example.

It is sometimes necessary to add a further element to the two safety valves if these are not enough to ensure all the safety systems (for reasons of bulk, namely of space required to house the valves). In this case, a depression clack valve is added. This depression clack valve can be used to cover cases of malfunctioning in a safety valve and to provide the normal conditions of safety with the two safety valves.

The aircraft 200 further has a regulation valve 28 and a ventilation valve 29. The regulation valve is designed to perform what are called "flight sequences" namely, it is designed to regulate the internal pressure so as to ensure the comfort of the passengers. The ventilation valve 29 enables complete balancing of the pressures when the aircraft is at a stop. It must be noted that modern aircraft such as, for example, aircraft of the AIRBUS A300, A310, A320, A330 and A340 series, have large volumes and have the possibility of maneuvering with rapid changes in altitude. Thus, it is imperative to be able to balance pressure very quickly to prevent the structure of the aircraft from being damaged by an excessive difference in pressure. Thus, it is necessary to introduce a clack valve which, in the event of a fast descent of the aircraft, would enable the external air to enter within, to achieve a balance such as this. Now, as stated earlier, the fact that a clack valve is positioned and that holes are made in the skin of the aircraft presents major drawbacks. Furthermore, owing to the performance characteristics and volume of the aircraft, the safety valves 30 and 31 could prove to be inadequate in the event of trouble. Thus, it is advantageous to use the controlled valves of FIGS. 1 to 4, to make the regulation valve and/or the ventilation valve.

Advantageously, it is the ventilation valve, which is normally not active in flight, that contains the clack valve 2 of FIGS. 1 to 4.

Advantageously, the controlled valves 28 and 29 are placed in the underside of the aircraft, beneath the waterline. Thus, the maintenance, which can be done from the bottom, is facilitated and, moreover, the flow of air-conditioning air is facilitated, the inlet of this air being located in the upper part of the aircraft. Thus, it is essential, in order to ensure the safety of the aircraft in the case of splash-down, to enable the blocking of the clack valve 2. The blocking is obtained by the operation of the "ditching" change-over switch on the control panel of the aircraft.

The making of butterfly valves or valves with two thrust recovery flaps does not go beyond the scope of the present invention.

The device according to the present invention can be applied to any device for regulating pressure and/or flow rate between a chamber and the exterior or between two chambers including a safety balancing device.

The invention can be applied notably to aeronautical construction, to the construction of petroleum refineries and to devices for the distribution of fluids and to chemical reactors.

What is claimed is:

1. A device for limiting a pressure difference comprising:
    a controlled valve, said controlled valve comprising means for regulating, on command, a fluid flow rate; and
    at least two clack valves each comprising two faces, at least one of said at least two clack valves being positioned on the surface of the controlled valve, said at least one clack valve providing for the balancing of pressure if the pressure difference on the two faces of the clack valve exceeds a threshold, wherein the flow passing through an opened clack valve can be controlled by said regulating means, and each clack valve comprises pull-back means enabling the closing of the clack valve when an opening criterion is not met, said opening criterion being different for each clack valve.

2. A device according to claim 1, comprising a computer designed to control the working of the clack valve.

3. A device for limiting a pressure difference comprising:
    a controlled valve, said controlled valve comprising means for regulating, on command, a fluid flow rate; and
    at least two clack valves each comprising two faces, at least one of said at least two clack valves being positioned on the surface of the controlled valve, said at least one clack valve providing for the balancing of pressure if the pressure difference on the two faces of the clack valve exceeds a threshold, wherein the flow passing through an opened clack valve can be controlled by said regulating means, and at least one of said at least two clack valves is designed to open in a first direction if the pressure prevailing on a first face of the controlled valve is greater than the pressure prevailing on a second face of the controlled valve, and the other of said two at least two clack valves is designed to open in a second direction if the pressure prevailing on a second face of the controlled valve is greater than the pressure prevailing on the first face of the controlled valve.

4. A device according to claim 3, comprising a computer designed to control the working of the clack valve.

* * * * *